United States Patent [19]

Mihara et al.

[11] Patent Number: 5,418,666
[45] Date of Patent: May 23, 1995

[54] HALF-HEIGHT MAGNETIC DISK DEVICE HAVING A LEAD WIRE RETAINING GROOVE IN THE ACTUATOR ARM

[75] Inventors: Takahisa Mihara, Sagamihara; Shoji Samma, Yokohama; Sigeo Saito, Sagamihara, all of Japan

[73] Assignee: Fujitsu Limited, Kawasaki, Japan

[21] Appl. No.: 197,541

[22] Filed: Feb. 17, 1994

Related U.S. Application Data

[60] Continuation of Ser. No. 68,610, May 27, 1993, abandoned, which is a continuation of Ser. No. 748,504, Aug. 22, 1991, abandoned, which is a division of Ser. No. 463,838, Jan. 11, 1990, Pat. No. 5,060,100, which is a continuation of Ser. No. 58,148, Jun. 4, 1987, abandoned.

[30] Foreign Application Priority Data

| Jun. 4, 1986 | [JP] | Japan | 61-85144 U |
| Jul. 18, 1986 | [JP] | Japan | 61-109459 U |
| Jul. 19, 1986 | [JP] | Japan | 61-110030 U |

[51] Int. Cl.[6] ............................ G11B 5/012
[52] U.S. Cl. ......................... 360/97.01; 360/106
[58] Field of Search .......... 360/98.01, 98.07, 98.08, 360/99.12, 97.01, 97.02, 97.03, 103–106, 108

[56] References Cited

U.S. PATENT DOCUMENTS

| Re. 32,702 | 6/1988 | Hasler et al. |  |
| 3,931,641 | 1/1976 | Watrous . |  |
| 4,161,004 | 7/1979 | Dalziel | 360/106 |
| 4,194,225 | 3/1980 | Hasler . |  |
| 4,196,456 | 4/1980 | Manzke | 360/106 |
| 4,352,134 | 9/1982 | Burns | 360/103 X |
| 4,367,502 | 1/1983 | Iftikar | 360/98 |
| 4,415,821 | 11/1983 | Wedman | 360/106 X |
| 4,568,988 | 2/1986 | McGinlay et al. . |  |
| 4,647,997 | 3/1987 | Westwood | 360/98 X |
| 4,700,250 | 10/1987 | Kuriyama | 360/104 |
| 4,707,754 | 11/1987 | Patel | 360/106 |
| 4,716,478 | 12/1987 | Walsh | 360/106 X |
| 4,739,429 | 4/1988 | Seki | 360/104 |
| 4,739,430 | 4/1988 | Manzke | 360/106 |
| 4,805,055 | 2/1989 | Wright | 360/106 |
| 5,023,733 | 6/1991 | Koga | 360/99.08 |

FOREIGN PATENT DOCUMENTS

| 0060358 | 9/1985 | European Pat. Off. . |
| 0157017 | 10/1985 | European Pat. Off. . |
| 0253626 | 1/1988 | European Pat. Off. . |
| 51-49012 | 4/1976 | Japan . |
| 57-191872 | 10/1982 | Japan . |
| 60-35319 | 6/1985 | Japan . |
| 60-35320 | 6/1985 | Japan . |

OTHER PUBLICATIONS

Nikkei Electronics 1985. Sep. 23 pp. 153–172.

*Primary Examiner*—A. J. Heinz
*Attorney, Agent, or Firm*—Staas & Halsey

[57] ABSTRACT

A magnetic disc device of half-height type comprising: a base; four magnetic discs disposed one above the other on the base; five head arms rotatable about a pivot for seeking motion on both surfaces of each magnetic disc; eight magnetic heads each attached to an end of the head arm through springs facing a surface of each disc; a rotational drive unit for swinging the head arms; a main printed circuit board disposed on a rear side of the base; and, a cover which covers an upper surface of the base.

23 Claims, 11 Drawing Sheets ial force thereof.
HALF-HEIGHT MAGNETIC DISK DEVICE HAVING A LEAD WIRE RETAINING GROOVE IN THE ACTUATOR ARM This application is a continuation of application Ser. No. 08/068,610, filed May 27, 1993, (now abandoned) which was a continuation of Ser. No. 07/748,504, filed Aug. 22, 1991 (now abandoned) which in turn was a division of Ser. No. 07/463,838, filed Jan. 11, 1990, (now U.S. Pat. No. 5,060,100) which in turn was a continuation of Ser. No. 058,148, filed Jun. 4, 1987, (now abandoned).

BACKGROUND OF THE INVENTION (1) Field of the Invention

The present invention relates to a magnetic disc device used as a memory means for mini-computers or micro-computers.

Conventionally, a Winchester type magnetic disc device using hard discs 3.5 inches in diameter has been used as a memory means for mini-computers or microcomputers. Such a magnetic disc devices must have a high memory density without any enlargement of the size thereof, to ensure that it is compatible with other conventional devices. Therefore, an improved magnetic disc device has been developed, which has a high memory density enriched by increasing the number of magnetic discs.

(2) Description of the Related Art

A conventional magnetic head of a known magnetic disc device is illustrated in FIGS. 13a and 13b. A magnetic head 5 includes coil lead wires 5a which are drawn upward in the direction opposite to a slider surface 5b. With this structure, the lead wires 5a may sometimes come into contact with a disc surface disposed above the magnetic head or another magnetic head disposed above and opposing this magnetic head 5 which will cause a short circuit or an instability of the head when in operation the head is separated from the disc surface and floating thereon.

Also, the conventional magnetic disc device includes a head actuator having a pivot 6f, as shown in FIG. 14. The pivot 6f has a plurality of head arms 6e which are secured to an outer sleeve 10. The outer sleeve 10 is installed on a stationary shaft 12 through two roller bearings 11 and 11'. The shaft 12 is disposed on a seat 12a for vertical positioning when secured to the base 1 through a screw. The diameter of the seat 12a is approximately the same as that of the outer sleeve 10. Therefore, the space corresponding to the height H of the seat 12a is wasted, thus causing an unnecessary enlarging of the case of the magnetic disc device.

A magnetic device has a record medium on which information data is recorded and a magnetic head for reading the information from that medium. The magnetic head is disposed in such a manner that it faces the recording area of the record medium, to transmit information data between the record medium and a read/write device.

When a magnetic disc is used as the magnetic medium, the head is attached to a head arm which carries the head and positions it at a desired track in the recording area of the magnetic disc. Therefore, in order to achieve an accurate positioning of the head at a high speed, it is necessary to reduce the weight of the head construction, including the head arm, to minimize the inertial force thereof.

A known magnetic head structure is illustrated in FIG. 12. A head 33 is supported at an end of a gimbal 32 which is secured to a head arm 31. Information data is transmitted between the head and a read/write device through a lead wire 34. A springy clip 35 made of plastic is attached to the head arm 31 to hold the lead wire 34 between the head arm 31 and the clip 35 along the head arm side edge.

With the above-mentioned magnetic head structure of the prior art, the head arm 31 becomes heavy, since the clip 35 is used for holding the lead wire 34, thus opposing the requirement for reducing the weight of the head arm structure. Also, the gap between the discs must be wide enough to accommodate the clips 35 therebetween, thus preventing a reduction of the height of the magnetic device.

SUMMARY OF THE INVENTION

Accordingly, an object of the present invention is to provide a magnetic disc device in which the problem of a short circuit of the lead wires or an instability of the magnetic head when in operation separated from the disc surface and floating thereon is eliminated.

Another object of the present invention is to provide a magnetic disc device which eliminates unnecessary dead space due to the pivot seat of the head actuator, thus realizing a more compact device.

A further object of the present invention is to provide a magnetic disc device having a light weight head structure.

The present invention especially realizes a half-height type magnetic disc device having a swing type actuator and four magnetic discs housed therein.

The height dimension of the magnetic disc device is commercially standardized and a full-height type magnetic disc device is marketed. Also, a half-height type magnetic disc device has been developed to realize a small size magnetic disc device which is compatible with the full-height type magnetic disc device. This type is advantageous from the standpoint of space saving since the height is one half that of the full-height type magnetic disc device.

On the other hand, when the capacity of the magnetic disc device is to be increased using an ordinary interface circuit, it is desirable to double the number of the discs, from the standpoint of easy installation of a new magnetic disc device having an increased capacity in place of an old device. It is relatively easy to exchange an old device with a new one and/or simultaneously use a new device with an old one through an ordinary interface circuit. Therefore, a two-disc magnetic disc device was developed as an improvement on a one-disc magnetic disc device. Subsequently, a magnetic disc device comprising four discs has been developed as an improvement on the two-disc device.

The present invention makes it possible to house four discs in a half-height type magnetic disc device, which could not be realized by the known devices, since four discs could not previously be stacked in the shortened half-height type device housing of the known structures.

In accordance with the present invention, there is provided a half-height type magnetic disc device having a base, four magnetic discs disposed one above the other on the base, five head arms rotatable about a pivot for a seeking motion on both surfaces of each disc, eight magnetic heads each attached to an end of the head arm facing a surface of each disc, rotational drive means for swinging the head arms, a main printed circuit board disposed on a rear side of the base, and a cover which covers an upper surface of the base.

Preferably, the magnetic head includes a slider and a core disposed at a back side of the slider for winding a coil thereon, a lead wire of the coil being taken out from an intermediate position of the core along the height thereof.

The pivot preferably has an outer sleeve to which the five head arms are secured, a stationary shaft secured on the base and on which the outer sleeve is rotatably installed, and a seat on which the shaft is supported on the base, the seat having an inclined periphery and the outer sleeve having a lower inner annular edge inclined to face the inclined periphery of the seat.

Preferably, each of the head arms has a groove formed thereon, the lead wire being fitted and held in the groove.

DETAILED DESCRIPTION OF THE PREFERRED EMBODIMENTS

Figure 5:
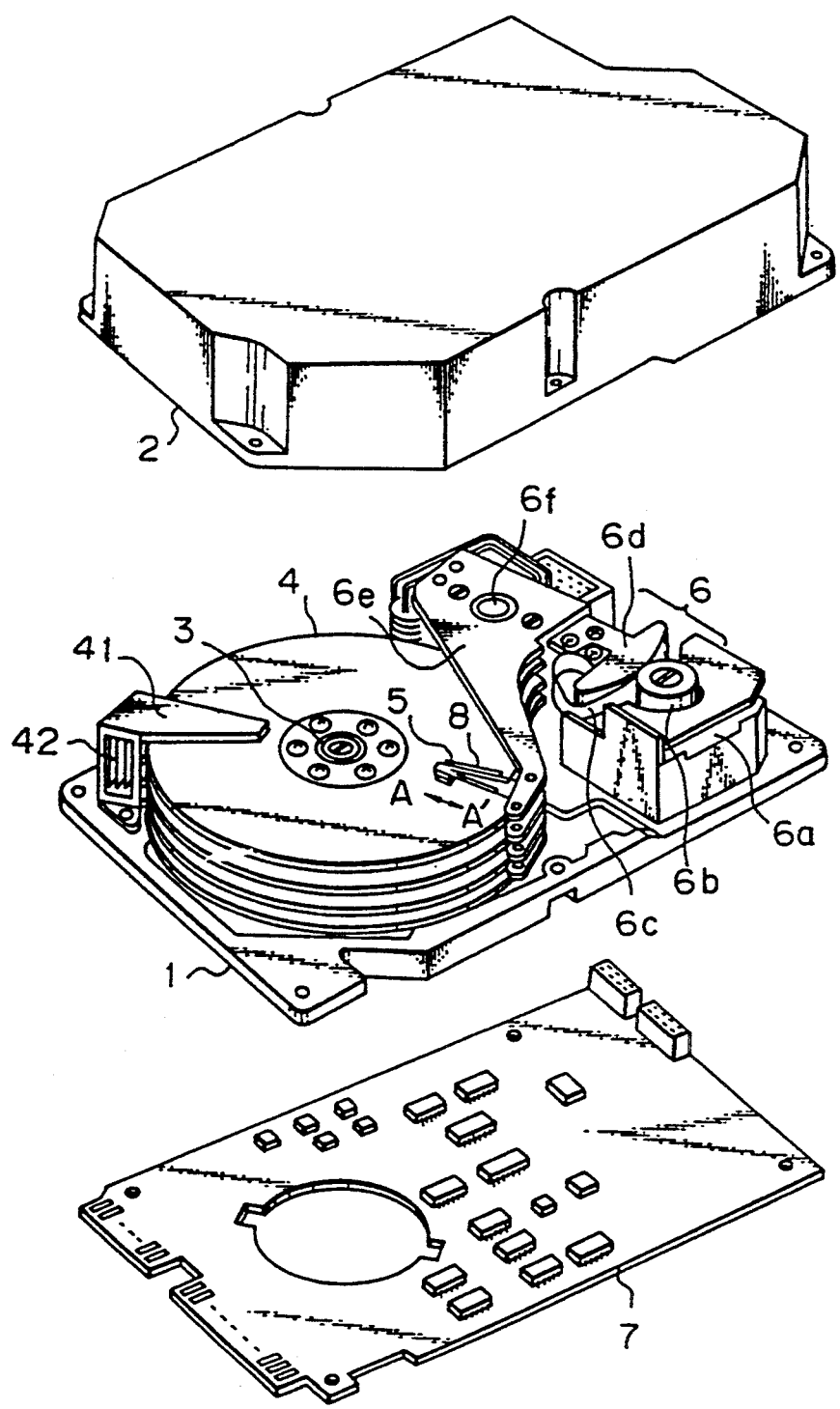
FIG. 5 is an exploded view of the magnetic disc device according to the present invention.
Figure 6:
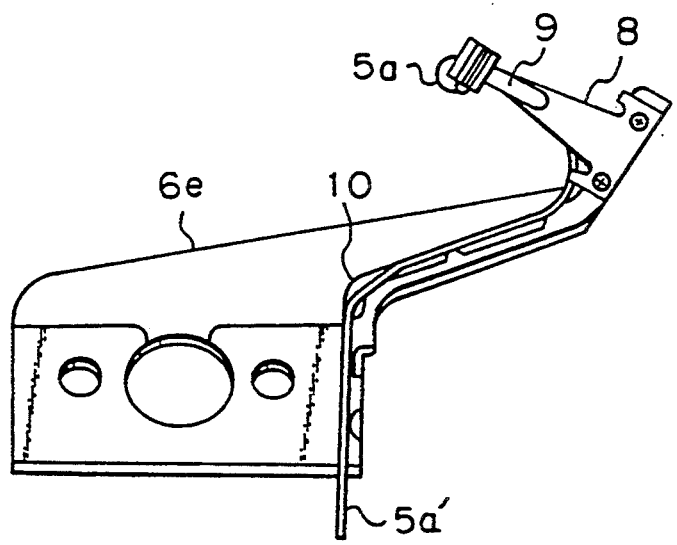
FIG. 6 is a plan view of a head arm of the magnetic disc device according to the present invention.

FIG. 5 is an exploded perspective view of a magnetic disc device according to the present invention. The magnetic disc device includes a housing formed by a base 1 and a cover 2, four magnetic discs 4 secured to a spindle 3, eight magnetic heads 5 for magnetic read/write operations at the upper and lower surfaces of each magnetic disc 4, and a head actuator 6 for swinging the magnetic heads 5 in the direction of the arrow AA' on the magnetic disc surfaces. The head actuator 6 includes a drive motor 6a, a capstan 6b, a steel belt 6c, a sector 6d, head arms 6e, and a pivot 6f. Below the base 1 are disposed a spindle drive motor (not shown), a printed circuit board for driving the spindle drive motor (not shown), and a main printed circuit board 7 mounting a read/write circuit for reading data from and writing data on the magnetic discs. Each magnetic head 5 is attached to a head arm 6e through a gimbal spring and a load spring 8.

Figure 1:
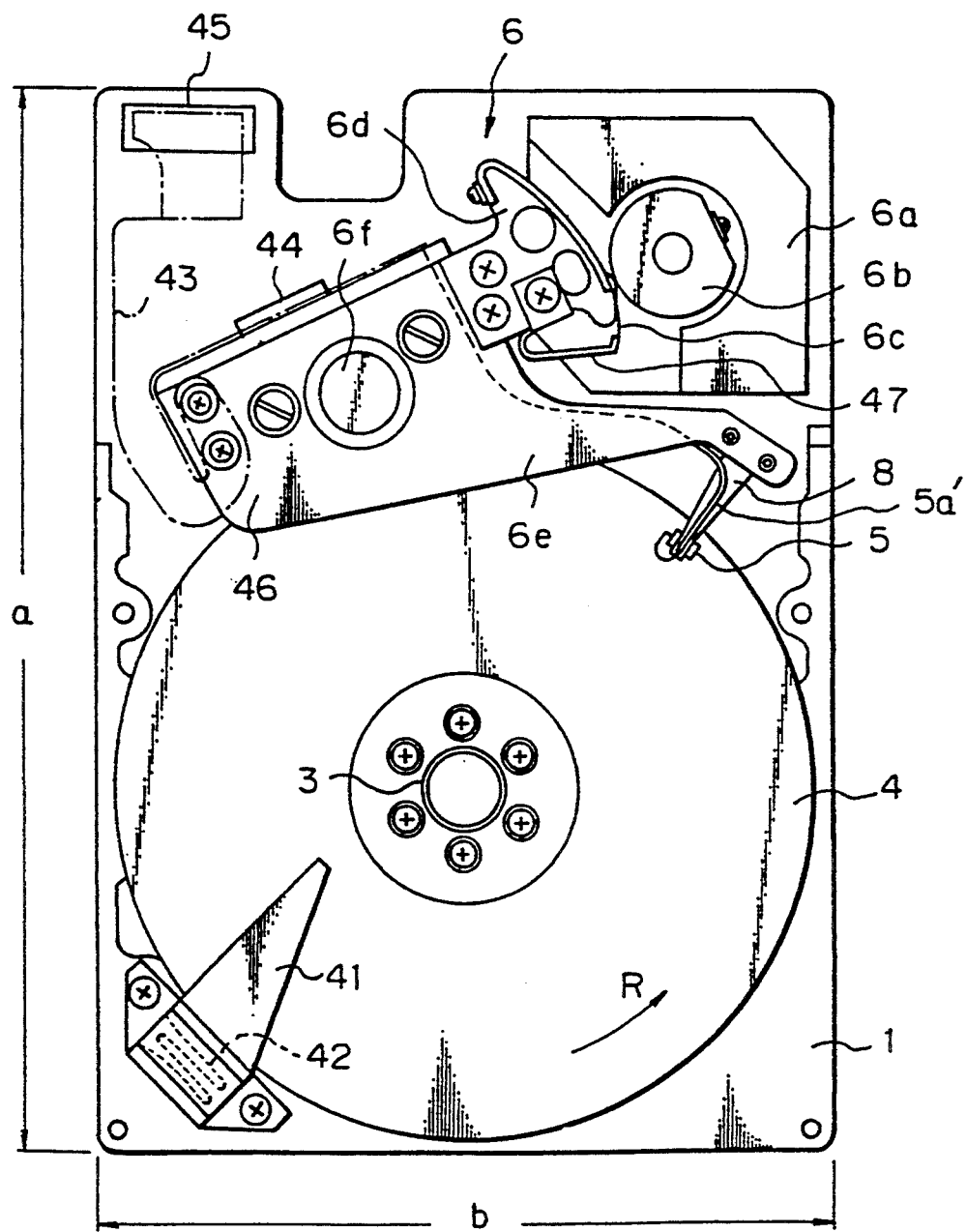
FIG. 1 is a plan view of a magnetic disc device according to the present invention, with the cover removed.
Figure 2:
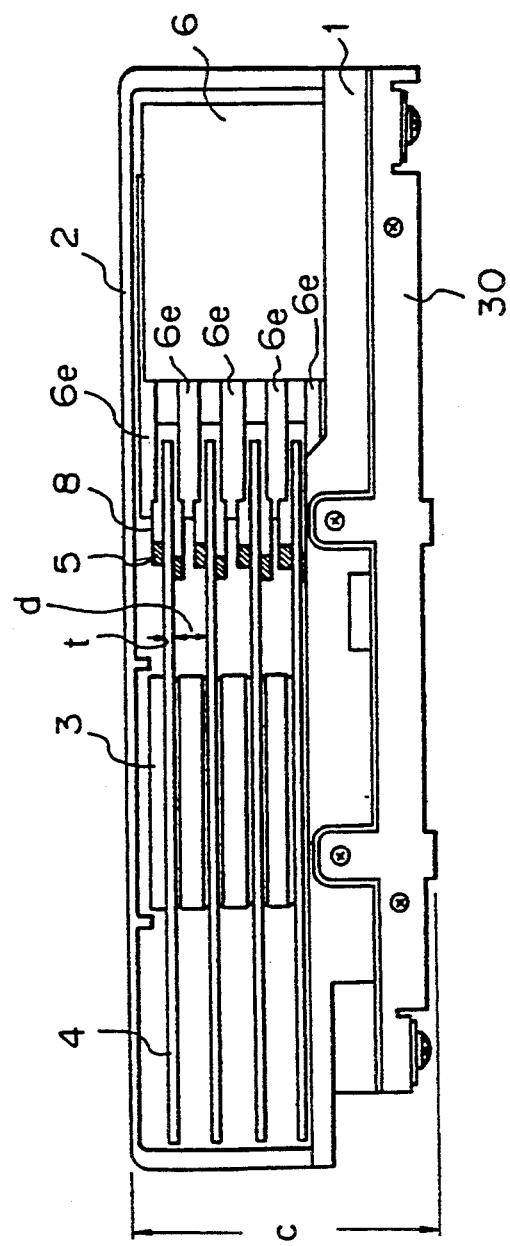
FIG. 2 is a vertical sectional view of the magnetic disc device according to the present invention.

The magnetic disc device illustrated in FIG. 1 is seen from the upper side thereof; with the cover removed, FIG. 2 shows a vertical section thereof. The magnetic disc device is of a half-height type having a commercially standardized outer shape dimension. That is, the disc diameter is 96 mm, the longitudinal length a=146±0.5 mm, the lateral length b=101.6±0.5 mm, and the height c=41.3±0.3 mm. A bottom plate 30 (FIG. 2) for covering the main printed circuit board 7 is disposed below the base 1 and secured thereto together with the main printed circuit board 7 by screws. The height c is the dimension between the lowest surface of the bottom plate 30 and the top surface of the cover 2. The gap d between the adjacent magnetic discs 4 is 4.5 mm, and the thickness t of each magnetic disc 4 is 1.27 mm. Five head arms 6e are arranged to conduct a seeking motion on both surfaces of the four magnetic discs 4, as shown in FIG. 2. The thickness of the two uppermost and lowermost head arms is 2.0 mm, and the thickness of the three intermediate head arms is 2.8 mm. The tip of each head arm 6e is thinned to 1.154 mm to attach the load spring 8. The gap between the lower surface of the lowermost magnetic disc 4 and the upper surface of the base 1 is 3.5 mm. Also, as described later, the gap w (FIG. 11) between the lower surface of the lowermost head arm 6e at the pivot portion and the upper surface of the base 1 is 0.5 mm.

The magnetic discs 4 rotate in the direction of the arrow R (FIG. 1). A baffle plate 41 is disposed corresponding to each of the four magnetic discs 4 facing the upper surface thereof. A filter 42 is incorporated in each baffle plates 41 to remove dust particles from the disc surface.

The magnetic head 5 is connected to a flexible printed circuit board 43 (shown by broken line) bonded behind the head arm 6e through a lead wire 5a'. A head IC (preamplifier) 44 is mounted on the flexible printed circuit board 43 behind the head arm 6e. The flexible printed circuit board 43 is connected to a connector 45 disposed at a corner of the base 1. The flexible printed circuit board 43 is loose and can be folded back and forth at the rear end of the head arm 6e to allow free movement without impeding the swing motion of the head arm 6e. The connector 45 is connected to the main printed circuit board 7 (FIG. 5) disposed under the base 1.

The head arm 6e has a counter weight portion 46 mounted at the side opposite the magnetic head attaching end thereof with respect to the pivot 6f. With the provision of the counter weight portion 46, it is possible to balance the weight of the head arm 6e with respect to the pivot 6f, thus achieving a smooth and stable swing motion of the head arm 6e irrespective of the attitude of the device.

Figure 3:
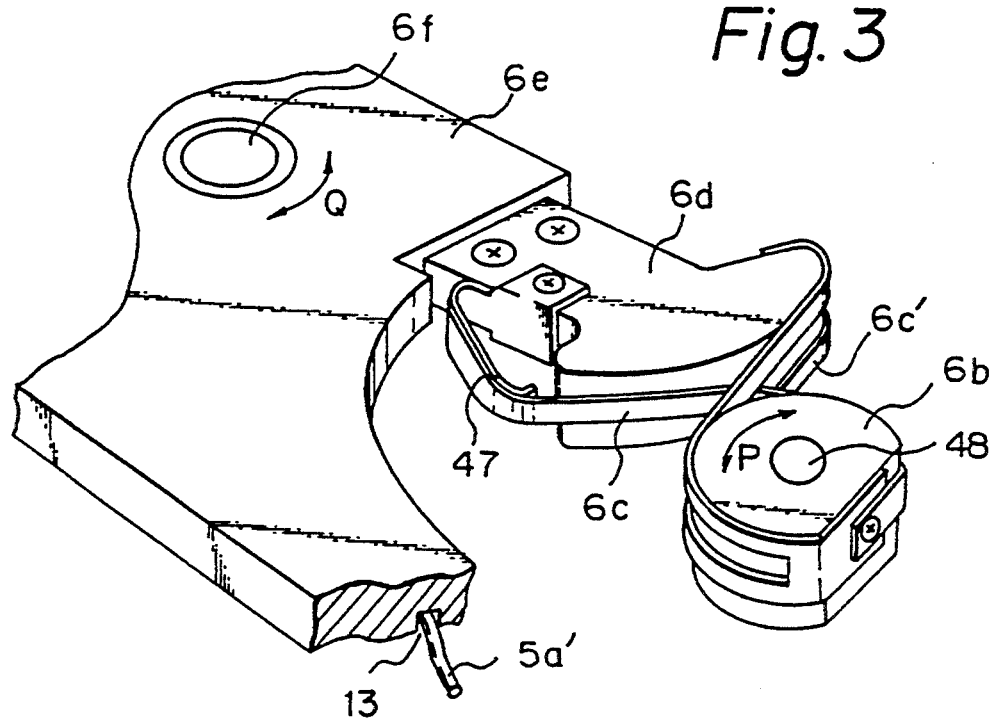
FIG. 3 is a perspective view of a head arm drive means of the magnetic disc device according to the present invention.

The swing actuator structure of the head arm 6e is illustrated in detail in FIG. 3. The head arm 6e is rotatable about the pivot 6f, as shown by the arrow Q, and a mushroom-shaped sector 6d is secured to the head arm 6e. A capstan 6b is disposed facing and adjacent to a head portion of the sector 6d. The capstan 6b is rotatable about a shaft 48, as shown by the arrow P, a tension spring 47 is attached to a stem portion of the sector 6d. An end of a steel belt 6c is bonded to the tension spring 47. Another steel belt 6c' is secured to the opposite side of the sector 6d. Both steel belts 6c and 6c' are wound around the capstan 6b and secured thereto at the back thereof by a screw. Both steel belts may be formed as one strip. With this structure, the capstan 6b is rotated as shown by the arrow P to swing the sector 6d through the steel belts 6c, 6c', thus rotating the head arm 6e as shown by the arrow Q about the pivot 6f. Numeral 13 designates a groove for holding the lead cable 5a', as described later in detail.

Figure 4:
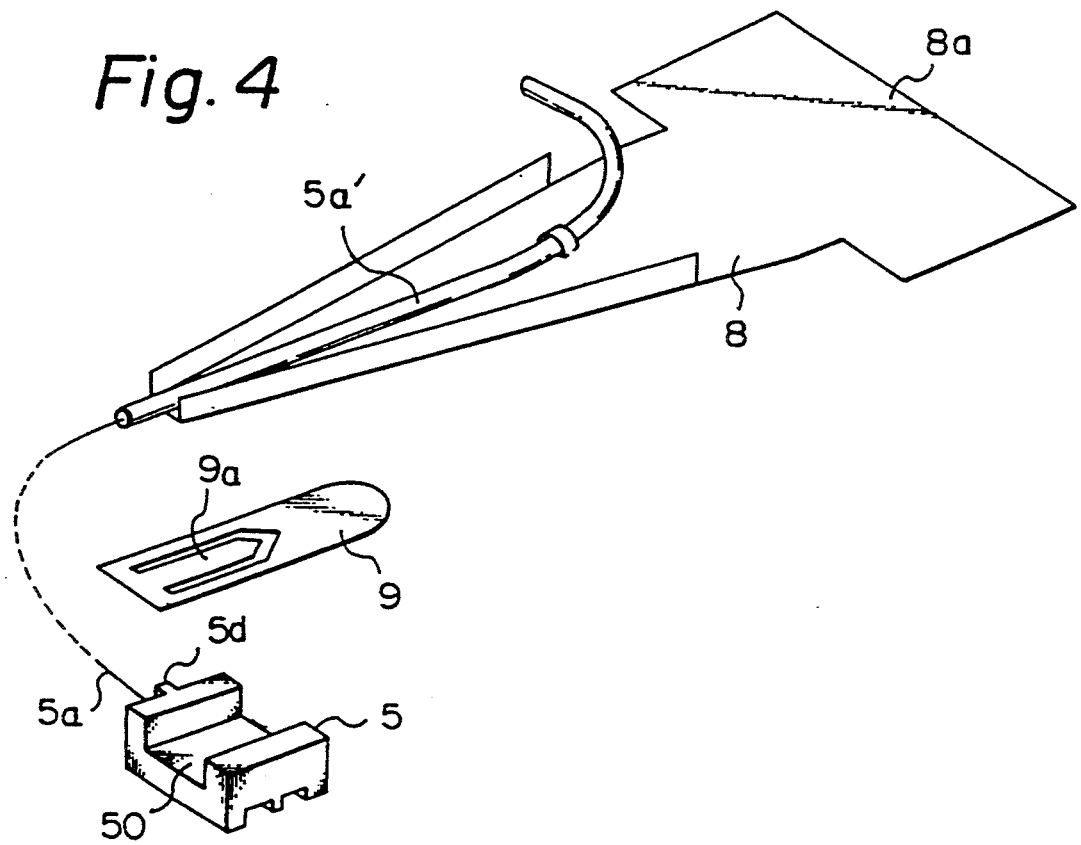
FIG. 4 is a partial, exploded view of a head support structure of the magnetic disc device according to the present invention.

The structure for supporting the magnetic head 5 is illustrated in detail in FIG. 4. The load spring 8 is made from a leaf spring. A gimbal 9 also made from a leaf spring is bonded to an end of the load spring 8 by spot welding. A support piece 9a is formed by cutting the inner area of the gimbal 9. The support piece 9a is bonded to an upper recess surface 50 of the magnetic head 5. The magnetic head 5 has a core 5d on which a coil (not shown) is wound and the coil lead 5a is taken out therefrom, as described in detail later. The coil lead 5a is covered by a protecting outer tube to form a lead cable 5a' emanating from the end portion of the load spring 8. A root portion 8a of the load spring 8 is secured to the end of the head arm 6e (FIG. 5). As shown in FIGS. 1, 4, 5 and 10, coil lead 5a extends from an intermediate portion of a sidewall of the head 5 and is connected to lead cable 5a'. Lead cable 5a', in turn, extends along the top surface of load spring 8 within the height of the load spring to a point outside of the magnetic disc and then is held in groove 13 formed within the height of head arm 6e on the bottom thereof.

A magnetic head coil structure according to the present invention is illustrated in FIGS. 10(a) and 10(b), wherein FIG. 10(a) is a plan view and FIG. 10(b) is a front view. In the drawings, the magnetic head 5 is formed as a slider having a slider surface 5b and a core 5d on which a coil 5e is wound. Reference 5a designates a coil lead, reference 5c designates an opening for forming a gap, and references 5f and 9 designate a gap and a gimbal, respectively. The gimbal 9 is bonded to the magnetic head 5 at the hatched portion thereof.

Figure 13A:
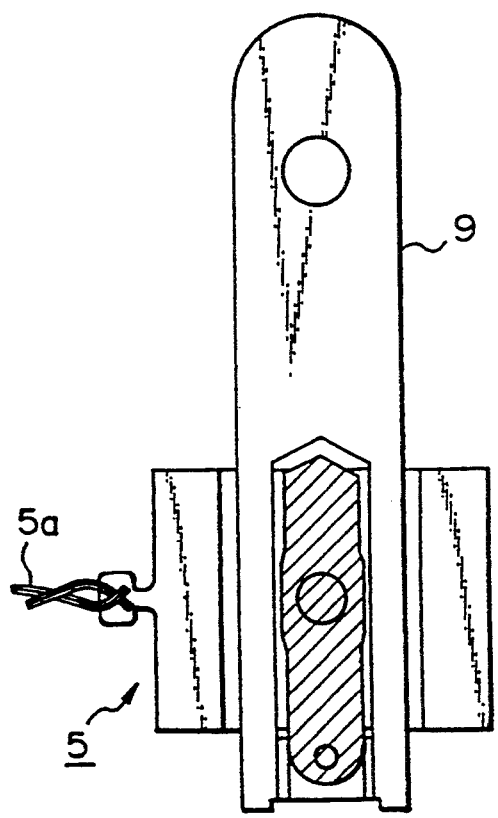
FIG. 13(a) is a plan view of a magnetic head.
Figure 13B:
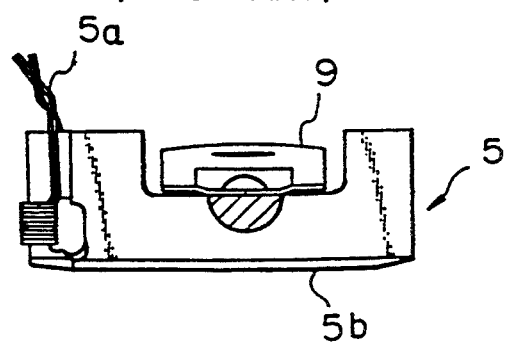
FIG. 13(b) is a front view of the FIG. 13(a) magnetic head.

As can be seen from the drawings, the lead wire 5a of the coil 5e of the magnetic head 5 is taken from the lateral side of the opening 5c. That is, the coil lead 5a is taken from the intermediate portion of its core 5d along the height thereof instead of the top of the core 5d as in the known structure of FIG. 13. Thus, the coil lead 5a is connected to the lead wire cable 5a' within the height $H_1$ shown in FIG. 10b.

The height $H_1$ of this embodiment can be shortened and the distance between the magnetic discs can be reduced without allowing the lead to come into contact with the disc surface, since the lead wire 5a is taken from the lateral side of the opening 5c in parallel with the slider surface 5b.

The lead wire 5a is disposed along the head arm through the load spring and connected to an amplifier attached behind the head arm. Preferably, the lead wire cable 5a' is fitted and held in a groove 10 formed in a surface of the head arm 6e, to reliably hold the cable and avoid contact between the cable and the disc surface.

As mentioned above, in accordance with the present invention, it is possible to reduce the distance between the magnetic discs with a simple structure without allowing the lead wire to come into contact with the magnetic disc surface, thus realizing a compact arrangement of the magnetic discs which is practically very useful.

Figure 11:
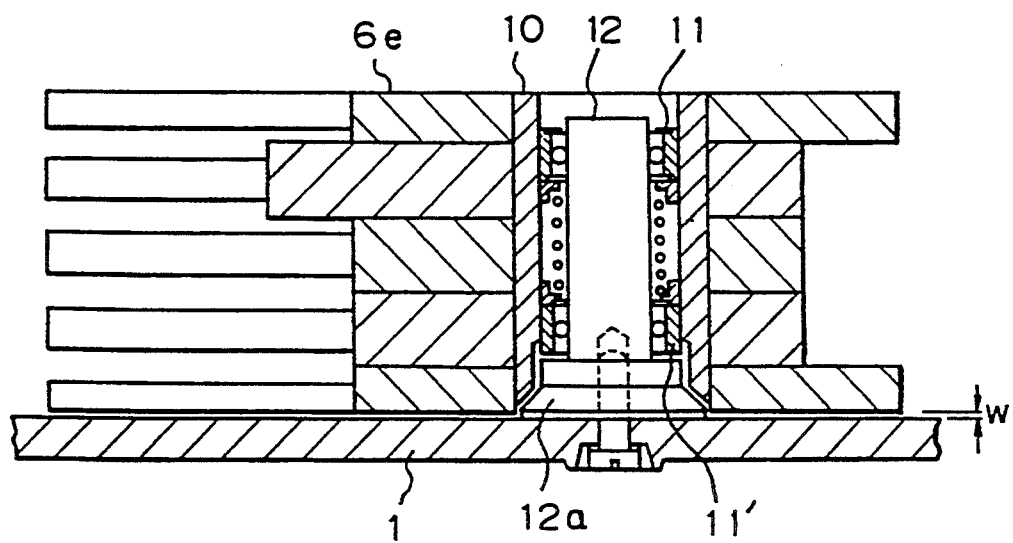
FIG. 11 is a sectional view of a pivot of the magnetic disc device according to the present invention.
Figure 12:
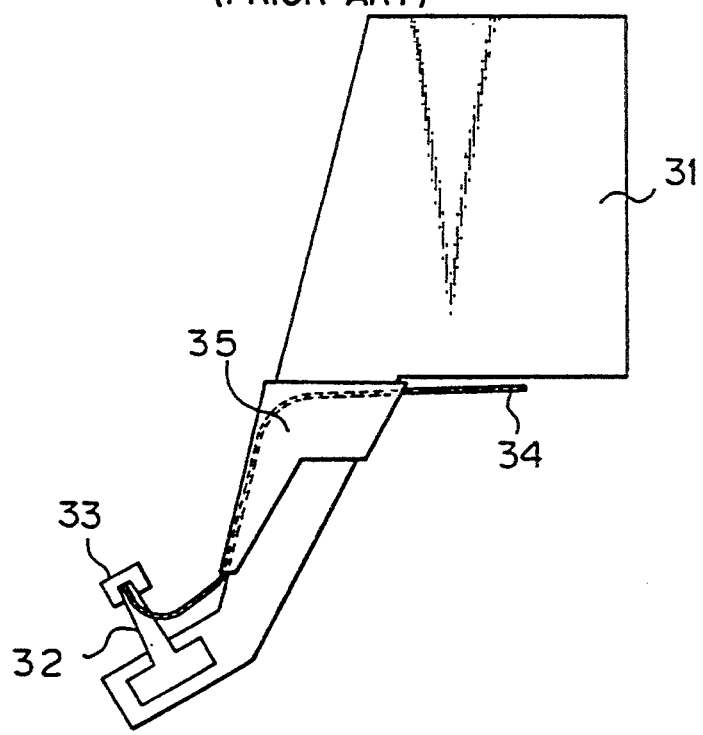
FIG. 12 is a plan view of a known magnetic head arm.

A pivot structure of the head arm according to the present invention is illustrated in FIG. 11. In the drawing, numeral 1 designates a base, 6e designates a head arm, 10 designates an outer sleeve, 11 and 11' designate roller bearings, and 12 designates a stationary shaft.

As shown in the drawing, this embodiment of the pivot structure includes the outer sleeve 10, which supports a plurality of head arms 6e simultaneously, and the stationary shaft 12 which rotatably supports the outer sleeve 10 thereon through two roller bearings 11 and 11'. The stationary shaft 12 is placed on a seat 12a having a diameter which is approximately the same as that of the outer sleeve 10, to ensure the verticality of the shaft which is secured to the base 1 by a screw, similar to the known structure of FIG. 14. A primary feature of this embodiment resides in the structure wherein the inner peripheral edge of the lower end of the outer sleeve 10 is inclined and the outer periphery of the seat 12a of the shaft 12 is also inclined in a direction facing the inner inclined lower end of the outer sleeve 10.

Figure 14:
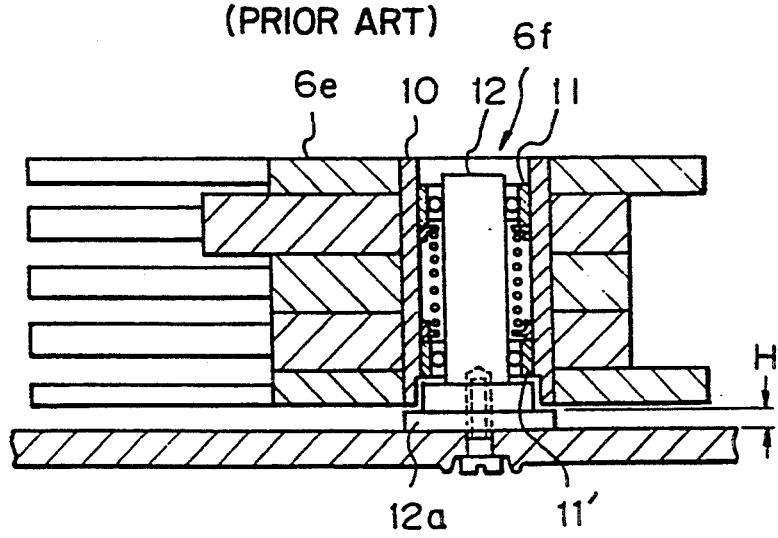
FIG. 14 is a sectional view of a pivot of a known magnetic disc device.

With such a structure, the seat 12a is arranged to fit into the inclined lower inner edge of the outer sleeve 10, thus eliminating the unnecessary dead space corresponding to the height H of the seat as described with reference to FIG. 14 of the known structure. Therefore, it is possible to reduce the height of the magnetic disc device.

As mentioned above, in accordance with the present invention, it is possible to eliminate the dead space for the pivot seat, with a very simple structure, thus realizing a small-sized magnetic disc device which has practical use. This is because the distance w (FIG. 11) between the lower surface of the head arm 6e and the upper surface of the base 1 is considerably reduced.

A coil lead wire cable arrangement according to the present invention is described hereinafter with reference to FIGS. 7 to 9.

Figure 7:
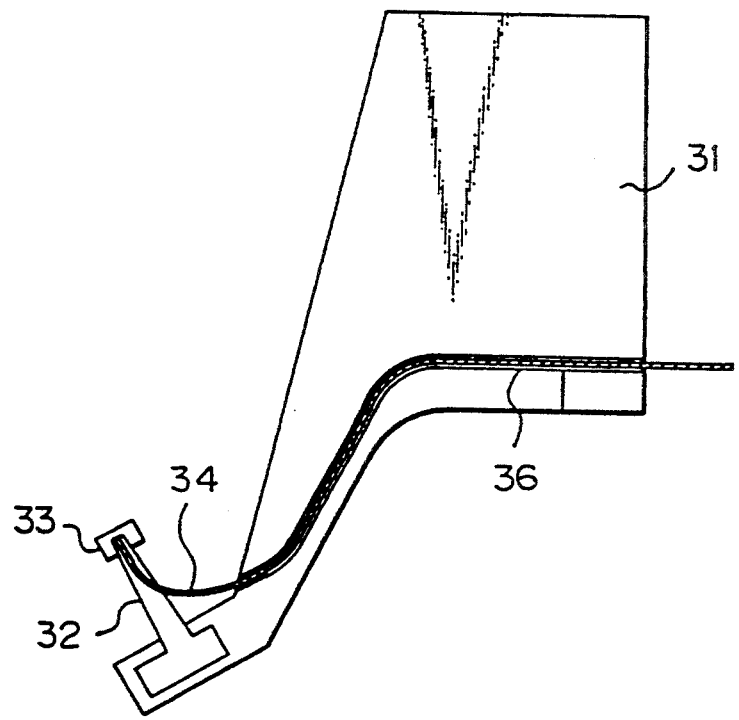
FIG. 7 is a plan view of a head arm of the magnetic disc device according to the present invention.

FIG. 7 is an explanatory view of the principle of the arrangement of the present invention. In FIG. 7, numeral 36 designates a cable holding means, which is a groove formed along a cable pass. The cable 34 is fitted into the groove.

The cable 34 is fitted and held in the groove of the holding means 36 formed in the head arm 31. Therefore, it is unnecessary to use a special instrument for holding the cable like a clip to hold the cable, thus reducing the weight of the magnetic head structure.

Figure 8A:
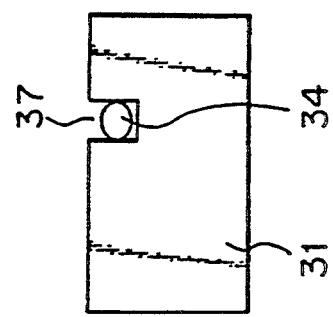
FIG. 8(a) is a plan view of another example of a head arm according to the present invention.
Figure 8B:
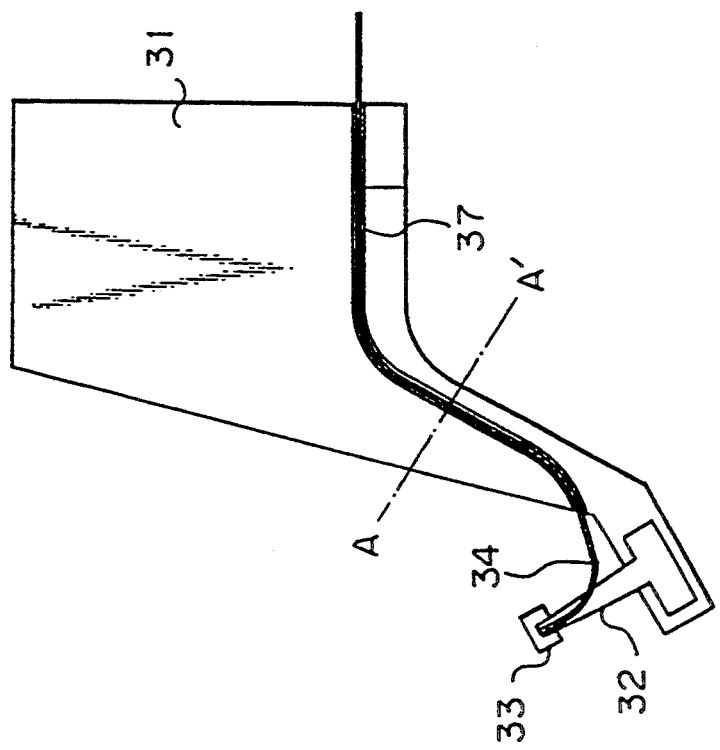
FIG. 8(b) is a sectional view taken along line A—A' of FIG. 8(a)

An example of the cable holding arrangement according to the present invention is illustrated in FIGS. 8(a) and 8(b), wherein the same parts as shown in FIG. 7 are designated by the same numerals. FIG. 8(a) is a plan view of the arrangement and FIG. 8(b) is a sectional view along the line AA' of FIG. 8(a). A groove 37 is formed as a cable holding means along the cable pass on the head arm 31. FIG. 8(b) shows a cross section of the groove 37, which forms a rectangular recess for receiving the cable 34.

The cable 34 is held in this groove 37 by press fitting the cable into the groove. An adhesive agent may be used to firmly hold the cable 34 within the groove 37.

Figure 9B:
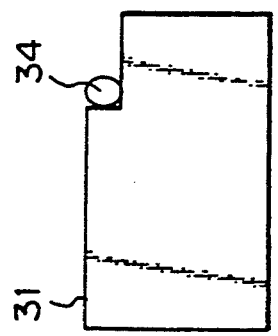
FIG. 9(b) is a sectional view taken along line B—B' of FIG. 9(a)
Figure 9C:
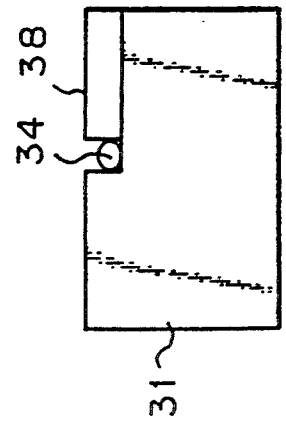
FIG. 9(c) is a sectional view taken along line C—C' of FIG. 9(a)
Figure 9A:
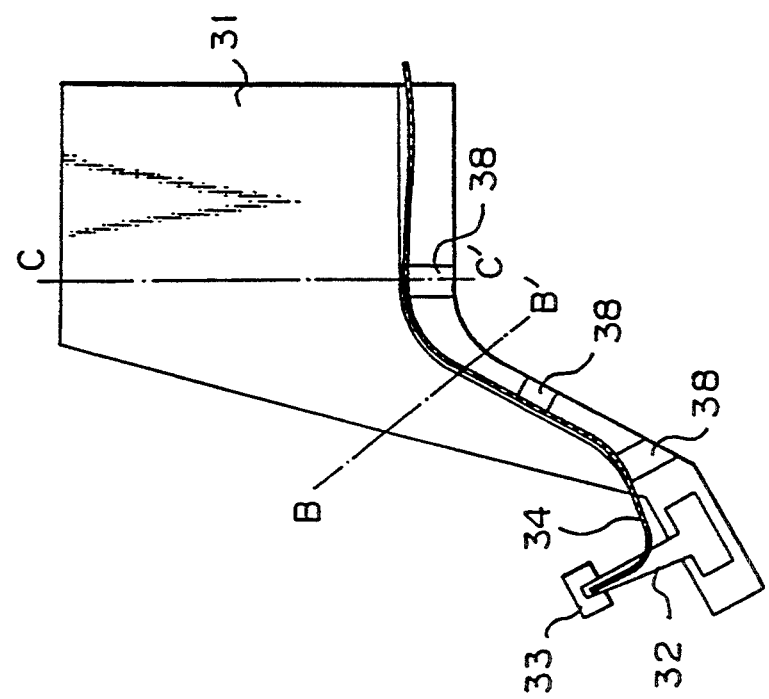
FIG. 9(a) is a plan view of another embodiment of a head arm of the present invention.
Figure 10:
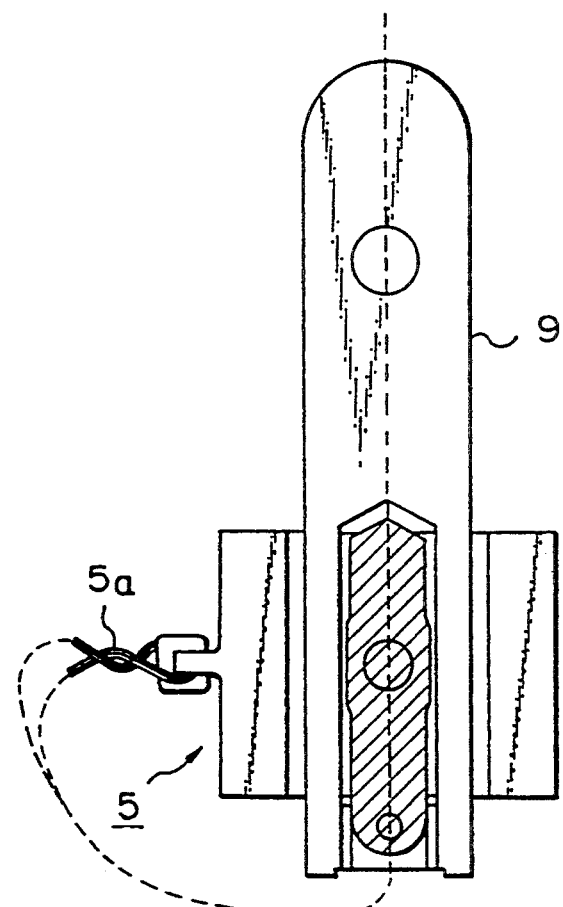
FIG. 10(a) is a plan view of an embodiment of a magnetic head of the present invention.
FIG. 10(b) is a front view of the FIG. 10(a) embodiment.
Figure 10:
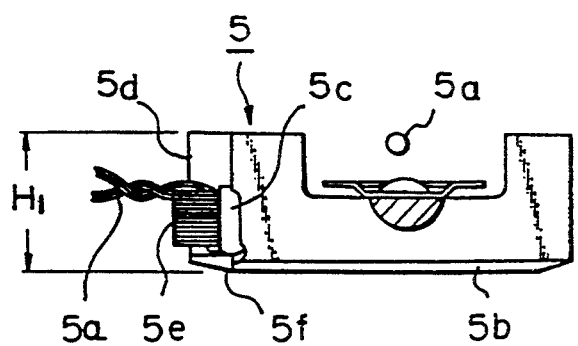

Another example of the cable holding arrangement according to the present invention is illustrated in FIG. 9(a), 9(b) and 9(c). A step is formed along the cable pass on the head arm 31, as shown in FIG. 9(b) which shows a cross section along the line BB' of the head arm 31 of FIG. 9(a). As best shown in FIG. 9(b), the step has a bottom surface which forms a first surface parallel to the surfaces of the magnetic disks and side surface which forms a second surface perpendicular to the first surface. A plurality of holder projections 38 are disposed along the step of the cable pass to partly form a groove-like portion, as shown in FIG. 9(c) which is a cross section along the line CC' of the head arm 31 of FIG. 9(a). The cable 34 is held in this groove-like portion. As a result in the present invention, the total thickness or height of the magnetic head 5, the head arm 6e and the structure for supporting the magnetic head can be further reduced.

As mentioned above, the magnetic head structure according to the present invention includes a groove as a lead wire holding means formed along the cable pass on the head arm, which makes it unnecessary to use a special cable holding instrument means, thus enabling a reduction of the weight of the magnetic head.

We claim:

1. A half-height type magnetic disc device comprising:
   a base;
   four magnetic discs disposed one above the other on said base;
   five head arms rotatable about a pivot for seeking motion on both surfaces of each magnetic disc;
   eight magnetic heads each attached to an end of one of said head arms through spring means and facing a surface of each disc;
   rotational drive means for swinging said head arms;
   a main printed circuit board disposed on a rear side of said base;
   a cover which covers an upper surface of said base;
   each said magnetic head comprising a slider having a slider surface and lateral sides and a core having a height and being disposed at one of the lateral sides of said slider for winding a coil thereon, a lead wire of said coil being taken out from an intermediate position of said core along the height of the core; and
   a groove formed in a surface of each of said head arms for holding said lead wire therein whereby said lead wire is located within the height of the core, the spring means and the head arm until the lead wire extends outside of said magnetic discs.

2. A magnetic disc device comprising:
   a base;
   at least four magnetic discs disposed one above the other on said base;
   at least five head arms rotating about a pivot for seeking motion on both surfaces of each magnetic disc, said head arms comprising an uppermost head arm, intermediate head arms and a lowermost head arm, each of said head arms comprising a body plate of a specified thickness positioned parallel to the magnetic discs, the lowermost head arm being in close proximity to the base;
   spring means attached to an end of each head arm;
   at least eight magnetic heads each attached to an end of one of said head arms through the spring means and facing a surface of a disc;
   rotational drive means for rotating said head arms;
   a main printed circuit board disposed on a rear side of said base;
   a cover which covers an upper surface of said base to form a casing having outer dimensions of a half-height type magnetic disc device;
   the base and the lowermost head arm defining a clearance which is less than a clearance between the head arms;
   said magnetic head comprising a slider having a slider surface and lateral sides and a core having a height and being disposed at one of the lateral sides of said slider for winding a coil thereon, a lead wire of said coil being taken out from an intermediate position of said core along the height of the core; and
   a groove formed in a surface of each of said head arms for holding said lead wire therein.

3. A magnetic disc device according to claim 2, wherein the uppermost head arm is in close proximity to the cover.

4. A magnetic device according to claim 2, wherein the cover and the uppermost head arm define a clearance which is less than a clearance between the head arms.

5. A magnetic disc device according to claim 2, wherein the thickness of the body plate of each of the lowermost head arm and the uppermost head arm is less than the thickness of each of the intermediate head arms.

6. A magnetic disc device according to claim 5, wherein the thickness of the body plate of each of the lowermost head arm and the uppermost arm is 2.0 millimeters.

7. A magnetic disc device according to claim 6, wherein the thickness of the body plate of each intermediate head arm is 2.8 millimeters.

8. A magnetic disc device according to claim 5, wherein the thickness of the body plate of each intermediate head arm is 2.8 millimeters.

9. A magnetic disc device according to claim 2, wherein each magnetic disc has a thickness of 1.27 millimeters and a gap between adjacent magnetic discs is 4.5 millimeters.

10. A magnetic disc device according to claim 9, wherein a gap between the lower surface of the lowermost head arm and the upper surface of the base is 0.5 millimeters.

11. A magnetic disc device according to claim 10, wherein the thickness of the body plate of each intermediate head arm is 2.8 millimeters.

12. A magnetic disc device according to claim 9, wherein the thickness of the body plate of each intermediate head arm is 2.8 millimeters.

13. A magnetic disc device according to claim 2, wherein the thickness of the body plate of each of the lowermost head arm and the uppermost arm is 2.0 millimeters.

14. A magnetic disc device according to claim 2, wherein the core includes a portion which defines a space between the core and the slider, the space extending in a height-wise direction of the core to facilitate winding of the coil thereon, the space extending substantially from the slider surface up to the intermediate position of the core.

15. A magnetic disc device according to claim 2, wherein said rotational drive means comprises a sector secured to said head arm; a capstan disposed adjacent to said sector; and a steel belt wound around said capstan, an end of said steel belt being secured to said sector to transmit the rotational motion of said capstan to said sector.

16. A magnetic disc device according to claim 2, wherein said spring means comprises a load spring secured to an end of each head arm; a gimbal secured to an end of said load spring; and a head supporting piece formed by cutting an inner area of said gimbal, said supporting piece being bonded to a recess on an upper side of said magnetic head.

17. A magnetic disc device according to claim 2, wherein said head arm has a counter weight portion provided at a side opposite to said magnetic head attaching end thereof with respect to said pivot.

18. A magnetic disc device comprising:
a housing;
a printed circuit board disposed on a side of said housing, a height of the magnetic disc device, including said housing and said printed circuit board, being of a height of a half-height type of a magnetic disc device;
at least four magnetic discs disposed in said housing;
at least eight magnetic heads each facing a surface of a disc, each said magnetic head comprising a slider having a slider surface and having a height in a direction perpendicular to the slider surface;
at least five head arms rotatable about a pivot for seeking motion on both surfaces of each magnetic disc, each of said head arms being moved over the respective surfaces of said magnetic discs during operation of the disc device, each of said head arms having a first surface parallel to the surfaces of said magnetic discs and a second surface perpendicular to the first surface;
rotational drive means for swinging said head arms;
a support structure supporting each said magnetic head, said support structure including a spring member for attaching said magnetic head to an end of one of said head arms;
a coil winding fixed to each said magnetic head, said coil winding being located within the height of said magnetic head, the height of said magnetic head being in a direction perpendicular to the surfaces of said magnetic discs;
a lead wire connected to said coil winding to communicate a signal between said printed circuit board and said coil winding; and
means for holding said lead wire to the second surface of said head arm by press-fitting, said lead wire being located within a total thickness of said magnetic head, said spring member, and said head arm, and along said head arm until said lead wire extends to outside of said magnetic disc.

19. A magnetic disc device according to claim 18, wherein said slider of each magnetic head has lateral sides; said magnetic head further comprises a core having a height in a direction perpendicular to the slider surface and being disposed at one of the lateral sides of the slider for winding a coil winding thereon; and wherein said lead wire is taken out from an intermediate portion of the core along the height of the core.

20. A magnetic disc device comprising:
a housing;
a printed circuit board disposed on a side of said housing, a height of the magnetic disc device, including said housing and said printed circuit board, being of a height of a half-height type of a magnetic disc device;
at least four magnetic discs disposed in said housing;
at least eight magnetic heads each facing a surface of a disc, each said magnetic head comprising a slider having a slider surface and having a height in a direction perpendicular to the slider surface;
at least five head arms rotatable about a pivot for seeking motion on both surfaces of each magnetic disc;
rotational drive means for swinging said head arms;
a support structure supporting each said magnetic head, said support structure including a spring member for attaching said magnetic head to an end of one of said head arms;
a coil winding fixed to each said magnetic head, said coil winding being located within the height of said magnetic head;
a lead wire connected to said coil winding to communicate a signal between said printed circuit board and said coil winding, said lead wire being located within a total thickness of said magnetic head, said spring member, and said head arm until said lead wire extends to outside of said magnetic disc, and
wherein each of said head arms has a groove on a surface thereof and said lead wire is positioned in said groove.

21. A magnetic disc device comprising:
a housing;
a printed circuit board disposed on a side of said housing, a height of the magnetic disc device, including said housing and said printed circuit board, being of a height of a half-height type of a magnetic disc device;
at least four magnetic discs disposed in said housing;
at least eight magnetic heads each facing a surface of a disc, each said magnetic head comprising a slider having a slider surface and having a height in a direction perpendicular to the slider surface;
at least five head arms rotatable about a pivot for seeking motion on both surfaces of each magnetic disc;
rotational drive means for swinging said head arms;
a support structure supporting each said magnetic head, said support structure including a spring member for attaching said magnetic head to an end of one of said head arms;
a coil winding fixed to each said magnetic head, said coil winding being located within the height of said magnetic head;
a lead wire connected to said coil winding to communicate a signal between said printed circuit board and said coil winding, said lead wire being located within a total thickness of said magnetic head, said spring member, and said head arm until said lead wire extends to outside of said magnetic disc; and
wherein each of said head arms has a groove on a surface thereof; said slider of each magnetic head has lateral sides; said magnetic head further comprises a core having a height in a direction perpendicular to the slider surface and being disposed at one of the lateral sides of the slider for winding a coil winding thereon; and wherein said lead wire is positioned in the groove of said head arm, and is taken out from an intermediate portion of the core along the height of the core.

22. A magnetic disc device comprising:
a housing;
a printed circuit board disposed on a side of said housing, a height of the magnetic disc device, including said housing and said printed circuit board, being of a height of a half-height type of a magnetic disc device;

at least four magnetic discs disposed in said housing;

at least eight magnetic heads each facing a surface of a disc, each said magnetic head comprising a slider having a slider surface and having a height in a direction perpendicular to the slider surface;

at least five head arms rotatable about a pivot for seeking motion on both surfaces of each magnetic disc, each of said head arms being moved over the respective surfaces of said magnetic discs during operation of the disc device, each of said head arms having a first surface parallel to the surfaces of said magnetic discs, and a second surface perpendicular to the first surface;

rotational drive means for swinging said head arms;

a support structure supporting each said magnetic head, said support structure including a spring member for attaching said magnetic head to an end of one of said head arms;

a coil winding fixed to each said magnetic head, said coil winding being located within the height of said magnetic head, the height of said magnetic head being in a direction perpendicular to the surfaces of said magnetic discs;

a lead wire connected to said coil winding to communicate a signal between said printed circuit board and said coil winding, said lead wire being located within a total thickness of said magnetic head, said spring member, and said head arm until said lead wire extends to outside of said magnetic disc; and means for holding said lead wire to the second surface of said head arm by press fitting along said head arm and within a total thickness of said magnetic head, said spring member, and said head arm until said lead wire extends to outside of said magnetic disc.

23. A magnetic disc device comprising:

a housing;

a printed circuit board disposed on a side of said housing, a height of the magnetic disc device, including said housing and said printed circuit board, being of a height of a half-height type of a magnetic disc device;

at least four magnetic discs disposed in said housing;

at least eight magnetic heads each facing a surface of a disc, each said magnetic head comprising a slider having a slider surface and having a height in a direction perpendicular to the slider surface;

at least five head arms rotatable about a pivot for seeking motion on both surfaces of each magnetic disc, each of said head arms being moved over the respective surfaces of said magnetic discs during operation of the disc device;

rotational drive means for swinging said head arms;

a support structure supporting each said magnetic head, said support structure including a spring member for attaching said magnetic head to an end of one of said head arms;

a coil winding fixed to each said magnetic head, said coil winding being located within the height of said magnetic head, the height of said magnetic head being in a direction perpendicular to the surfaces of said magnetic discs;

a lead wire connection to said coil winding to communicate a signal between said printed circuit board and said coil winding, said lead wire being located within a total thickness of said magnetic head, said spring member, and said head arm until said lead wire extends to outside of said magnetic disc; and means for holding said lead wire along said head arm and within a total thickness of said magnetic head, said spring members, and said head arm, until said lead wire extends to outside of said magnetic disc, said means for holding said lead wire comprising a groove provided in said head arm.

* * * * *

UNITED STATES PATENT AND TRADEMARK OFFICE
CERTIFICATE OF CORRECTION

PATENT NO. : 5,418,666
DATED : May 23, 1995
INVENTOR(S) : MIHARA et al.

It is certified that error appears in the above-indentified patent and that said Letters Patent is hereby corrected as shown below:

Col. 3, line 55, change "a magnetic" to --a known magnetic--.

Col. 4, line 44, change "plates" to --plate--;
line 47, change "by" to --by a--.

Col. 5, line 11, change "be formed" to --be integrally formed--.

Signed and Sealed this

Twenty-fourth Day of October, 1995

Attest:

BRUCE LEHMAN

Attesting Officer

Commissioner of Patents and Trademarks